Patented May 14, 1940

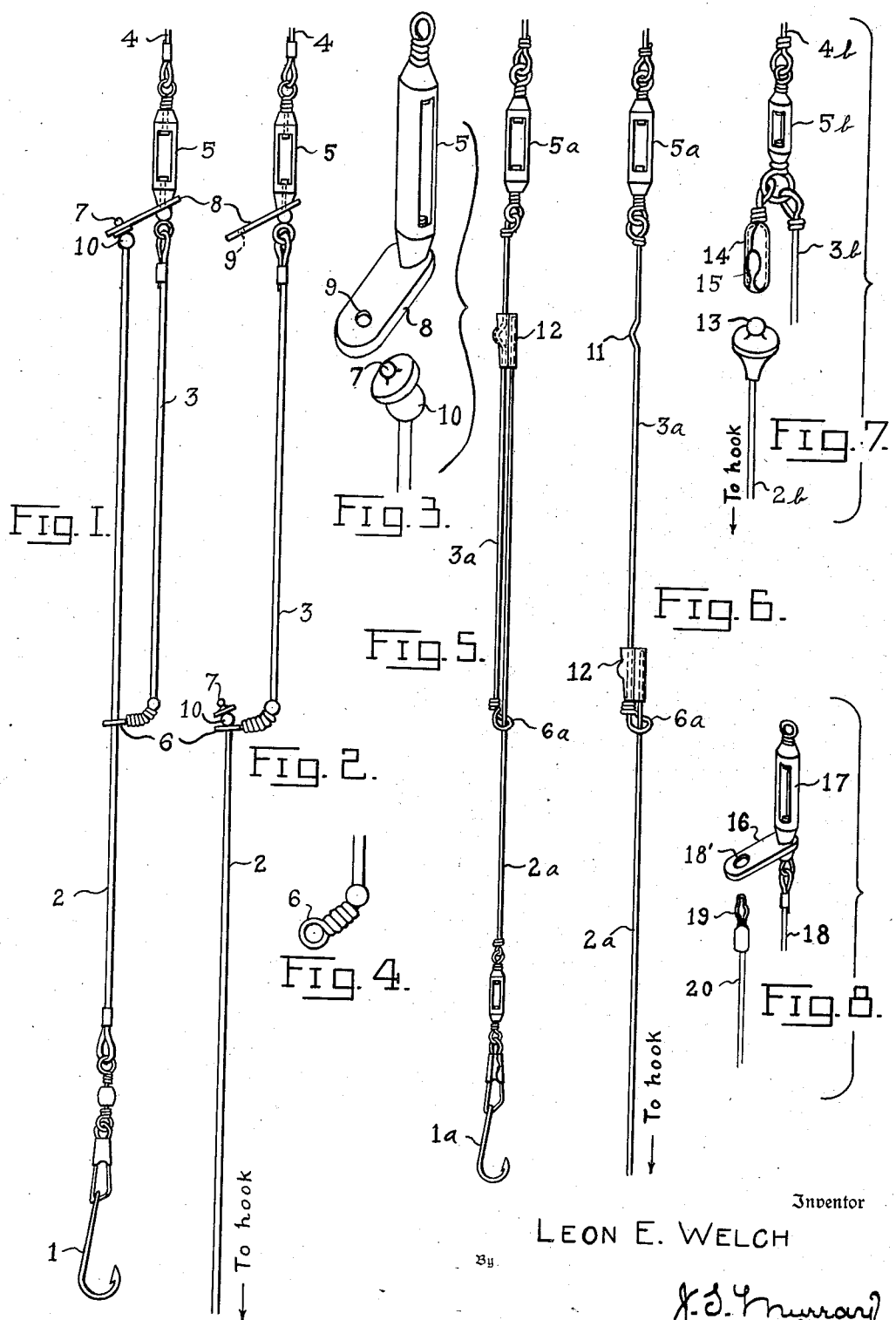

2,200,651

UNITED STATES PATENT OFFICE 2,200,651

SELF-STRIKING FISHING LEADER

Leon E. Welch, Detroit, Mich.

Application September 13, 1939, Serial No. 294,619

5 Claims. (Cl. 43—15)

This invention relates to fishing leaders and particularly leaders for use in casting or trolling.

An object of the invention is to provide a fishing leader adapted for a predetermined increase in length responsive to the pull exerted by a fish, whereby the fish is afforded a limited free movement, and to utilize the jerk resulting from cessation of such movement to embed the hook firmly in the fish.

Another object is to provide a fishing leader having separate line-engaging and bait-carrying lengths, each substantially inextensible, the latter being initially set to lap the former and being freely movable under predetermined stress to predeterminedly increase the length of the leader.

A further object is to adapt a bait-carrying length of a fishing leader to be set to initially lap a line-engaging length of such leader, and to slide on the last-named length to form an extension thereof, the setting means being a snap fastener releasable responsive to a predetermined pull, whereby a fish taking the bait is afforded a limited free movement, terminated with a sudden jerk embedding the hook in the fish.

These and various other objects the invention attains by the construction hereinafter described and illustrated in the accompanying drawing, wherein:

Fig. 1 is an elevational view of one form of the improved leader as set for self-striking.

Fig. 2 is a similar view of said leader with its catch released.

Fig. 3 is enlarged perspective view of the released catch.

Fig. 4 is an enlarged perspective view of an eyelet carried by one length of the leader for engaging the other length.

Fig. 5 is an elevational view of a modified form of the leader, as set for self-striking.

Fig. 6 is a similar view of said modification with the catch elements disengaged.

Fig. 7 is a perspective view of a further modified type of catch with its elements disengaged.

Fig. 8 is a perspective view of a further modification of the catch with its elements disengaged.

In these views, and describing first the modification shown in Figs. 1-4, the reference character 1 designates a hook, 2 a length of leader terminally carrying said hook, and 3 a length of leader attached to a fish line 4. The lengths 2 and 3 may be formed of any suitably strong flexible material as braided wire. The line 4 is attached to one end of the length 3 by a swivel fitting 5 and the other end of said length carries a laterally projecting eyelet 6 slidably engaging the length 2. The hook is carried by the trailing end of the length 2 and the opposite or leading end of said length carries a small knob 7 of slightly resilient material, as sheet metal and adapted by its resiliency to undergo a slight compression. Rigidly carried by the leader-engaging end of the fitting 5 is a lug 8 formed with a small aperture 9 serving as a socket for the knob 7, such lug and knob jointly forming a catch releasable under predetermined stress. When the hook with its bait is seized by a fish, the catch is designed for release by the resultant pull, thus affording the fish a free movement a few inches in extent. This movement is predetermined in amount by the length 3, since the leader is extended a distance equal to said length upon release of the catch. The solder 10 securing the knob 7 to the length 2 provides a liimting abutment for the eyelet 6, abruptly terminating relative sliding of the two lengths and halting free movement of the fish with a sudden jerk. It has been established by numerous tests of the leader that this jerk has the effect of firmly embedding the hook in the mouth of a fish. Thus, in casting or trolling, it is not necessary, with this improved leader, that the line be jerked by the fisherman when a fish takes the bait. Striking or hooking the fish, heretofore usually dependent on timely action by the fisherman, is automatically accomplished through use of the described leader, by the fish itself.

In the modification shown in Figs. 5 and 6, 2a designates a length of leader carrying the hook 1a, 3a is a length of leader attachable to a fish line through a swivel fitting 5a, and 6a is an eyelet on the trailing end of the length 3a, such eyelet slidably engaging the length 2a. Both lengths 2a and 3a are preferably formed of fairly stiff wire and the upper part of the length 3a is permanently laterally offset to form a small V bend 11. Soldered or otherwise rigidly secured to the upper end of the length 2a is a small open ended sheet metal sleeve 12, so flattened as to form a socket barely large enough to accommodate the bend 11. When the hook-carrying section is raised, as shown in Fig. 5, so as to engage the bend in the sleeve, the two lengths are in a lapped relation, which is frictionally maintained by interengagement of the bend and sleeve. A predetermined pull on the hook will withdraw the sleeve from the bend 11 and permit the leader to be extended, as shown in Fig. 6.

The modified catch shown in Fig. 7 comprises a ball element 13 adapted to snugly fit within a split sleeve element 14 having a slight restriction at its open lower end and formed with a narrow slot 15 upwardly extending from such end to afford a limited expansion and contraction of such end. The sleeve is subjected to a slight expansion as the ball is inserted and a predetermined pull is required to permit escape of the ball past said restricted lower end. As illustrated, the ball 13 is carried by the upper end of a hook-carrying length 2b of the leader, and the sleeve is pivotally attached to the swivel fitting 5b by which the other length 3b of the leader is attachable to a fish line 4b.

The modified catch shown in Fig. 8 attaches a laterally projecting lug 16 rigidly to the lower end of a fitting 17 by which a length 18 of the leader is swivelly attached to a fish line, said lug being apertured as indicated at 18' to receive a wire loop 19 on the upper end of the hook-carrying length 20. The lower portion of the loop 19 is slightly enlarged so as to resiliently resist passage through the aperture 18', a predetermined pull sufficing to withdraw the loop from the lug and thus release the catch.

It will be seen that the invention in each of its described forms is characterized by the fact that the leader is formed in two lengths, one of which is initially secured by a suitable catch in a raised position lapping the other length, the catch being releasable responsive to a predetermined pull, so as to permit the hook-carrying length to slide down and form an extension of the other length. In each embodiment of the invention, a fish seizing the bait will be afforded a limited free movement, adapted to be terminated with a sudden jerk such as will effectively set the hook barb in the mouth or throat of the fish.

An important feature of the described leader is its avoidance of any material projections affording lodgement to weeds. This is quite essential to a satisfactory leader, it being common knowledge that the best casting is often found in water infested with weeds.

The self-striking feature of the improved leader renders casting and trolling less arduous, by relieving the fisherman of constant close attention to his line in order to effect a manual striking of any fish taking the bait.

This leader is adaptable for self-striking use with any standard artificial bait and also with any suitable live bait.

The invention is presented as including all such modifications and changes as come within the scope of the following claims.

What I claim is:

1. A fishing leader comprising a length attachable to a fish line, and a separate hook-carrying length, both substantially inextensible, a catch comprising interengageable elements respectively carried by the respective lengths and adapted to secure such lengths in a substantially side by side relation, said catch being releasable responsive to a predetermined pull, the hook-carrying length being slidable along the other length upon release of the catch, to form an extension of the other length, an abutment fixed on one of said lengths, and means on the other length for engaging such abutment to definitely establish the extension-forming position of the hook-carrying length.

2. A fishing leader, comprising a length attachable to a fish line, and a separate hook-carrying length, both substantially inextensible, a catch comprising interengageable elements respectively carried by the respective lengths and adapted to secure such lengths in a lapped relation, said catch being releasable responsive to a predetermined pull, an eyelet carried by one of said lengths and freely receiving the other and slidable along the other upon release of the catch, and an abutment on the other engageable by said eyelet to definitely limit sliding of the eyelet.

3. A fishing leader as set forth in claim 2, the line-engaging length having a leading end attachable to a fish line and carrying one of said catch elements, and a trailing end carrying said eyelet, and the other length having an end portion for carrying a hook, its other end portion carrying said abutment and the other element of said catch.

4. A fishing leader as set forth in claim 2, said catch comprising male and female elements, one of which is resiliently adapted to resist disengagement of said elements.

5. In a fishing leader as set forth in claim 2, a swivel fitting for attaching the leader to a fish line, one of said catch elements being mounted on such fitting.

LEON E. WELCH.